(12) United States Patent
Jubinville et al.

(10) Patent No.: US 6,199,514 B1
(45) Date of Patent: Mar. 13, 2001

(54) METHOD OF RESTRAINING AN ANIMAL WITHIN AN ANIMAL SQUEEZE, AND AN ANIMAL SQUEEZE

(76) Inventors: Leonard Arthur Jubinville; Giselle Jubinville, both of R.R. #2, St. Albert, Alberta (CA), T8N 1M9

( * ) Notice: Subject to any disclaimer, the term of this patent is extended or adjusted under 35 U.S.C. 154(b) by 0 days.

(21) Appl. No.: 09/281,762

(22) Filed: Mar. 30, 1999

(51) Int. Cl.[7] ............................. A01K 15/04; A61D 3/00
(52) U.S. Cl. ..................... 119/728; 119/733; 119/752; 119/749; 452/54
(58) Field of Search ................................... 119/728, 751, 119/752, 754, 756, 730, 731, 732, 733, 738, 749, 712, 725; 452/54, 53, 56

(56) References Cited

U.S. PATENT DOCUMENTS

| | | | |
|---|---|---|---|
| 175,377 | * 3/1876 | Page | 119/712 |
| 1,234,733 | * 7/1917 | Corington | 119/722 |
| 2,537,387 | * 1/1951 | Wnetrzak | 452/55 |
| 2,660,982 | * 12/1953 | Linton | 119/752 |
| 2,853,052 | * 9/1958 | Pearson | 119/517 |
| 3,027,594 | 4/1962 | Moss | 17/45 |
| 3,112,519 | 12/1963 | Hlavacek et al. | 17/45 |
| 3,115,670 | 12/1963 | Hlavacek et al. | 17/45 |
| 3,683,864 | * 8/1972 | Priefert | 119/752 |
| 3,685,492 | * 8/1972 | Baker | 119/517 |
| 3,703,743 | * 11/1972 | Schmidt, Jr. | 452/55 |
| 3,766,890 | * 10/1973 | Baker | 119/751 |
| 4,183,326 | * 1/1980 | Wills . | |
| 4,444,150 | * 4/1984 | Hueftle et al. | 119/522 |
| 5,383,425 | 1/1995 | Bleacher | 119/729 |
| 5,645,016 | 7/1997 | Mahurin | 119/752 |
| 5,738,045 | * 4/1998 | Bleacher | 119/751 |
| 5,752,472 | 5/1998 | Jubinville et al. | 119/728 |

FOREIGN PATENT DOCUMENTS

| | | | |
|---|---|---|---|
| 1261722 | 1/1972 | (GB) | 119/728 |
| 2141614 | * 1/1985 | (GB) . | |
| 8131004 | * 5/1996 | (JP) . | |

* cited by examiner

Primary Examiner—Michael J. Carone
Assistant Examiner—James S. Bergin
(74) Attorney, Agent, or Firm—Christensen O'Connor Johnson Kindness PLLC (57) ABSTRACT

A method and apparatus for restraining an animal within an animal squeeze. The animal squeeze has a "V" shaped passage in which the animal is suspended by relative movement of the sidewalls and the floor. A pressure member is movable into an operative position engaging a back of the animal and restraining the animal. An animal, such as a deer, suspended in a "V" shaped passage, will normally continue to struggle. However, when pressure is exerted upon the back of the deer by the pressure member, the deer ceases to struggle.

20 Claims, 9 Drawing Sheets

METHOD OF RESTRAINING AN ANIMAL WITHIN AN ANIMAL SQUEEZE, AND AN ANIMAL SQUEEZE

FIELD OF THE INVENTION

The present invention relates to a method of restraining an animal within an animal squeeze, and an animal squeeze constructed in accordance with the teachings of the method.

BACKGROUND OF THE INVENTION

The present invention relates to animal squeezes generally, but more particularly, animal squeezes that are intended for use with deer. Deer are high strung animals that tend to become stressed and frantic to escape when confined within an animal squeeze. Frequently, deer become injured, as they struggle to escape.

SUMMARY OF THE INVENTION

What is required is a better method of restraining a deer within an animal squeeze, and an animal squeeze constructed in accordance with the teachings of the method.

According to one aspect of the present invention there is provided an animal squeeze which includes a chute having a first end, a second end, sidewalls, a floor and a generally "V" shaped passage that extends from the first end to the second end. Means are provided for causing relative movement of the sidewalls and the floor to suspend an animal in the "V" shaped passage. A pressure member is movably secured to the chute. The pressure member has an operative position exerting a substantially vertical downward force upon a back of an animal positioned within the chute.

According to another aspect of the invention there is provided a method of restraining a deer within an animal squeeze. An animal squeeze is provided having a pressure member, as described above. An animal is directed into and confined within the chute. The animal is suspended in the "V" shaped passage by causing relative movement of the sidewalls and the floor. The pressure member is positioned in the operative position engaging a back of the animal and a restraining force exerted upon the animal in the chute.

A deer suspended in a "V" shaped passage, will continue to struggle. However, when a pressure is exerted upon the back of the deer, the deer ceases to struggle. This makes the deer much easier to work with and virtually eliminates the danger that the deer, by continuing to struggle, will hurt itself. Once the teachings of this method are understood there a various refinements that can be added to further improve the operation of the apparatus.

The first prototype has a pressure member that was pivotally mounted to one of the sidewalls. This pressure member pivoted a substantially horizontal pivot axis and onto the back of the deer. Although that configuration was workable, the back restraint is much more effective when the chute is constructed with an upper support structure that overlies the passage, such as a ceiling. The pressure member is mounted to the upper support structure and has a substantially vertical operative position. The pressure member is telescopically expandable with means provided for locking the pressure member in a selected telescopic position.

The preferred configuration of chute has a pair of parallel sidewalls with opposed wedge members extending longitudinally between the first end and the second end to make the passage generally "V" shaped. A drop floor is provided that is selectively movable between a supporting position supporting an animal and dropped position leaving the animal edged between the wedge members in the generally "V" shaped passage.

Human access to the rear of the animal is the best way to conduct some procedures, such as artificial insemination. Even more beneficial results may, therefore, be obtained when the chute has a side entry service door large enough for a human to enter through at least one of the sidewalls at the first end of the chute. It is preferred that a kick guard be positioned within the chute at an intermediate position adjacent the side entry service door and toward the second end. The kick guard has an operative position in a vertical orientation extending transversely across the chute. Beneficial results have been obtained when the kick guard is a pivotally mounted section of the floor. Access to elsewhere on the animal can be obtained by having with shuttered upper and lower access doors in the sidewalls.

Deer are extremely quick. It is, therefore, preferred that a pair of opposed shoulders be provided that extend into the passage and block passage of an animal at the second end of the chute. It is also preferred that a sensor be provided that will drop the floor automatically to suspend the deer when the deer reaches a certain point along the chute. The use of shoulders, an automatic trigger to the drop floor or both enables the head of the animal to be positioned as close as possible to the second end of the chute. This is desirable in order to provide access to the head for trimming antlers and doing other work on the animal. A combination of both makes possible having the animals head actually protruding from the second end of the chute. This would be very difficult without shoulder pads and relying solely upon human reflexes to trigger the drop floor.

The preferred manner of releasing the animal, is have all or a portion of one of the sidewalls hinged to pivot in a position widening the passage. This drops the animal to the ground and leaves sufficient clearance between the shoulders to exit from the second end of the chute.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, an animal squeeze generally identified by reference numeral 10, will now be described with reference to FIGS. 1 through 12.

Figure 1:
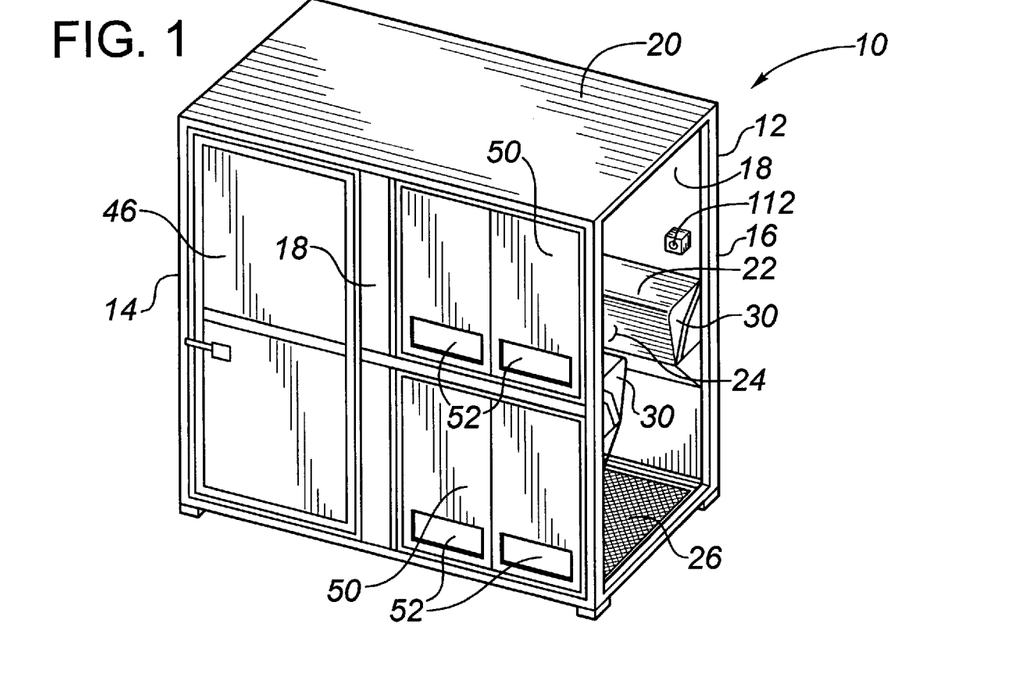
FIG. 1 is a perspective view of an animal squeeze constructed in accordance with the teachings of the present invention.
Figure 5:
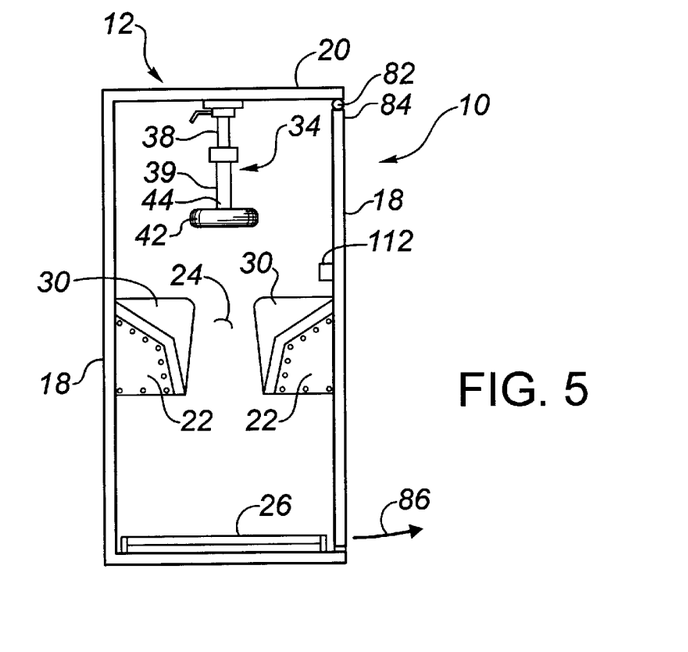
FIG. 5 is an end elevation view of the animal squeeze illustrated in FIG. 1.

Referring to FIG. 1, animal squeeze 10 includes a chute 12 having a first end 14, a second end 16, and a pair of parallel opposed sidewalls 18. Referring to FIG. 5, a pair of opposed wedge members 22 extends longitudinally along sidewalls 18 forming a generally "V" shaped passage 24 that extends between first end 14 and second end 16.

Figure 2:
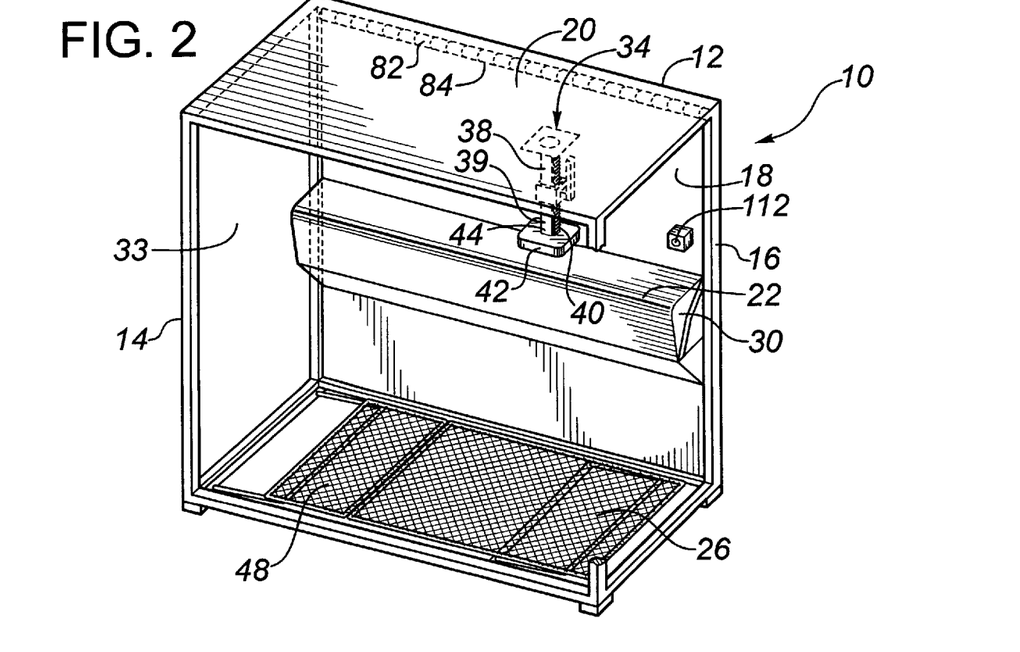
FIG. 2 is a cut away perspective view of the animal squeeze illustrated in FIG. 1, with the floor in a dropped position.
Figure 3:
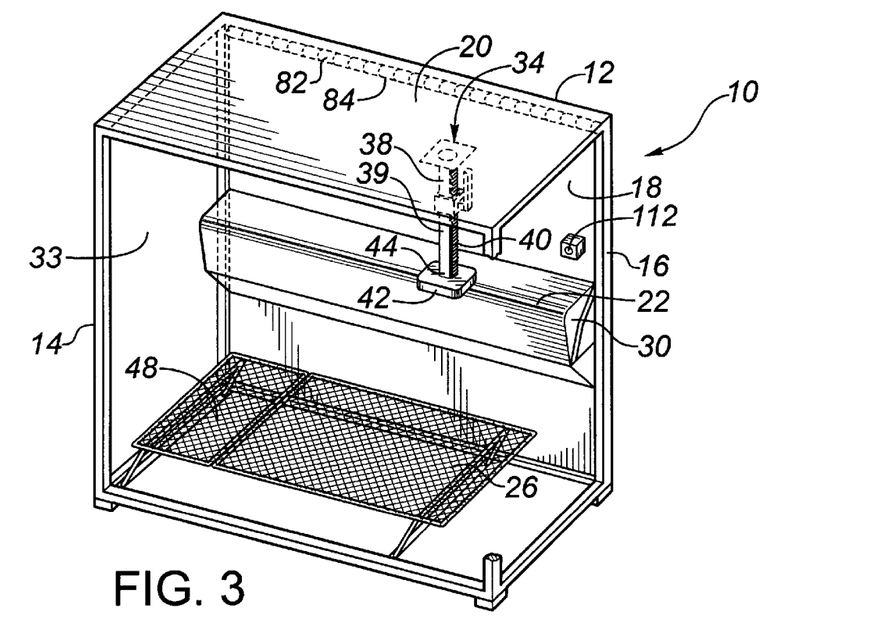
FIG. 3 is a cut away perspective view of the animal squeeze illustrated in FIG. 1, with the floor in a supporting position.
Figure 7:
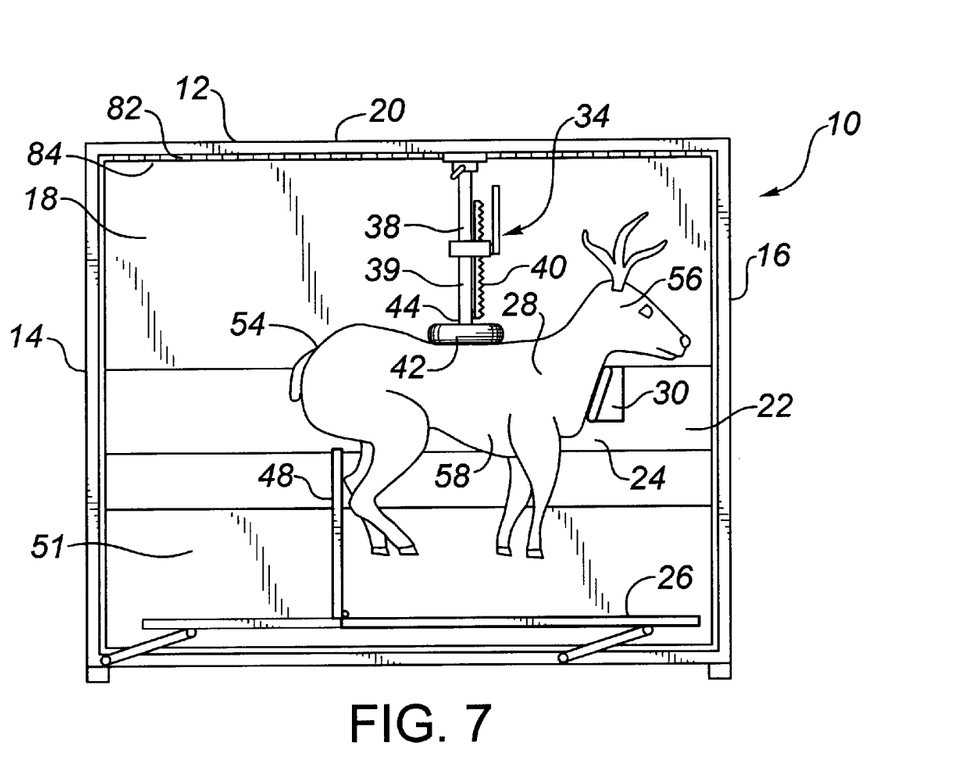
FIG. 7 is a side elevation view, in section, of the animal squeeze illustrated in FIG. 1.

Referring to FIGS. 2 and 3, a drop floor 26 is selectively movable between a supporting position, illustrated in FIG. 3, supporting an animal, and a dropped position, illustrated in FIG. 2. Referring to FIG. 7, when an animal 28 is wedged between the wedge members 22 in the generally "V" shaped passage 24 and drop floor 26 is in the dropped position, animal 28 is supported between wedge members 22.

Referring to FIG. 3, a sensor 112 is positioned within chute 12 and coupled to a release mechanism (not shown) for drop floor 26. When the presence of an animal is detected by sensor 112, the release mechanism is tripped and drop floor 26 drops, thereby leaving the animal wedged in "V" shaped passage 24.

Figure 12:
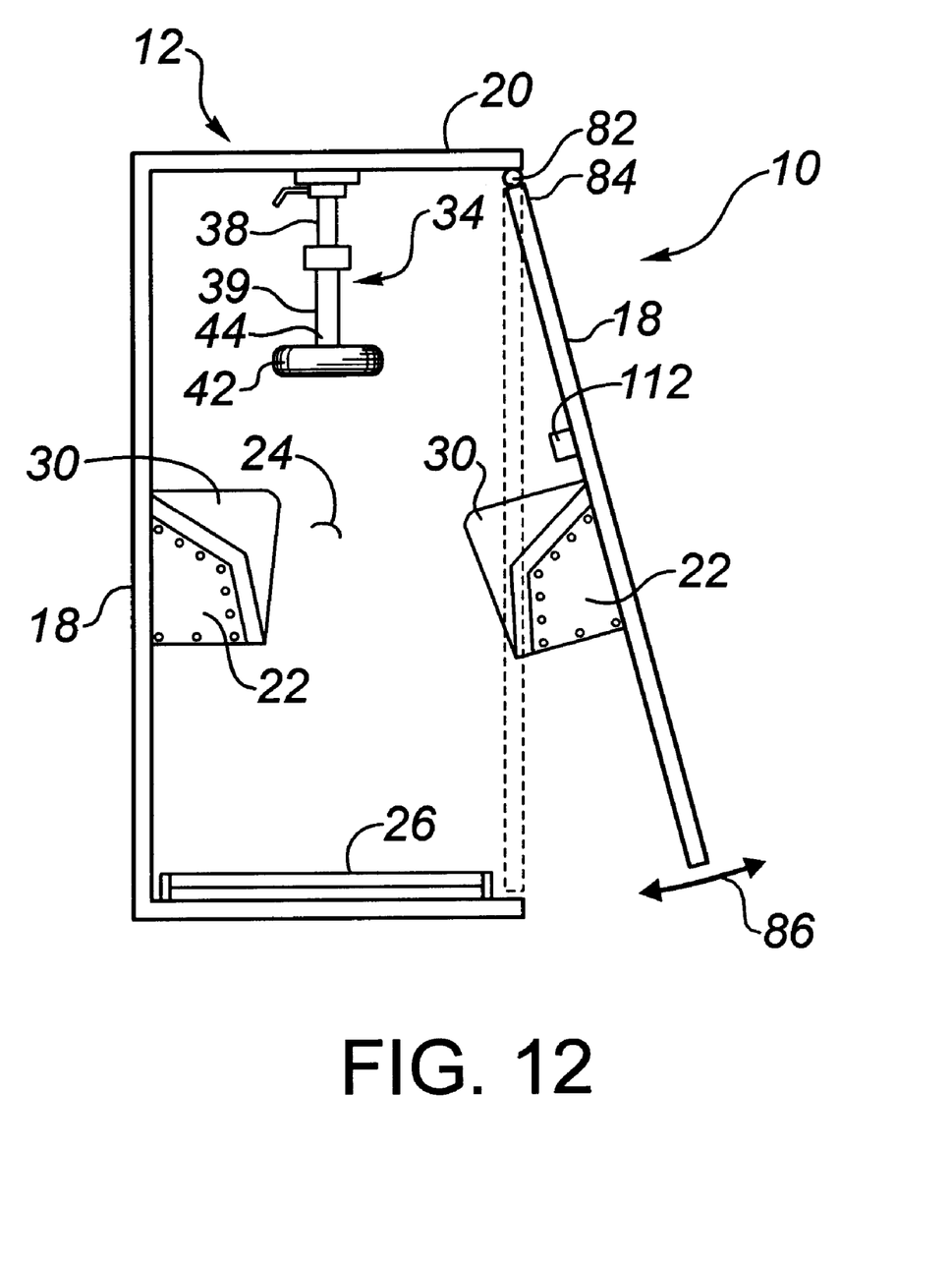
FIG. 12 is an end elevation view of the animal squeeze illustrated in FIG. 1, with sidewalls pivoted to an animal release position.

Referring to FIG. 5, an upper support structure 20 overlies passage 24. In the illustrated embodiment upper support structure is a ceiling that encloses chute 12. Upper support structure could, however, be in the form of a single horizontal mounting beam. A pair of opposed shoulder mountings 30 are provided for blocking movement of an animal through passage 24 at second end 16 of chute 12. Shoulders mountings 30 are detachably secured to whichever of first end 14 and second end 16 is approached by an animal when said animal is within chute 12. Referring to FIGS. 5 and 12, at least one of pair of sidewalls 18 is attached by a hinge 82 that extends laterally along a top peripheral edge 84 of sidewall 18 and along the length of chute 12 adjacent to upper support structure 20. Sidewall 18 connected by hinge 82 to chute 12 is pivotally movable about a substantially horizontal axis, externally from chute 12, away from and toward opposite sidewall 18, as indicated by curved double arrow 86, between a substantially vertical closed position illustrated in FIG. 5 and an angled open position illustrated in FIG. 12. Referring to FIG. 12, when hinged sidewall 18 is in open position, one of each of the pair of opposed shoulder mountings 30 and wedge member 22 attached to the same sidewall as said shoulder mounting 30 is moved to a retracted position, thereby widening "V" shaped passage 24 and releasing the animal to exit from second end 16 of chute 12.

Figure 9:
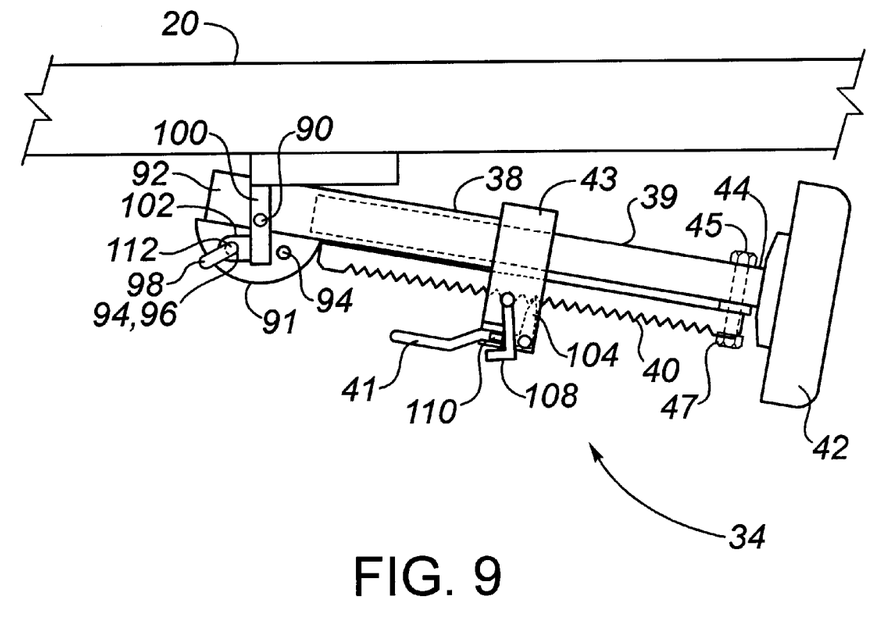
FIG. 9 is a detailed side elevation view of the pressure member for the animal squeeze illustrated in FIG. 1, in a substantially horizontal stored position.
Figure 10:
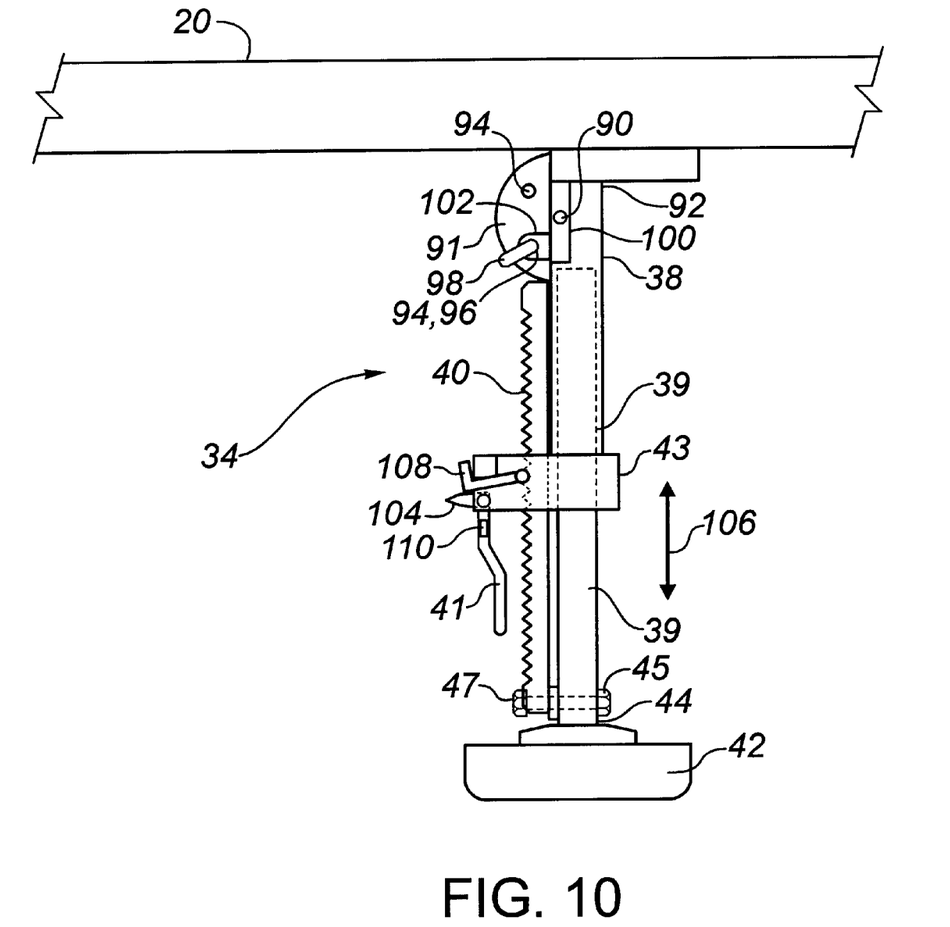
FIG. 10 is a detailed side elevation view of the pressure member for the animal squeeze illustrated in FIG. 1, in a substantially vertical operative position with locking lever in a release position.
Figure 11:
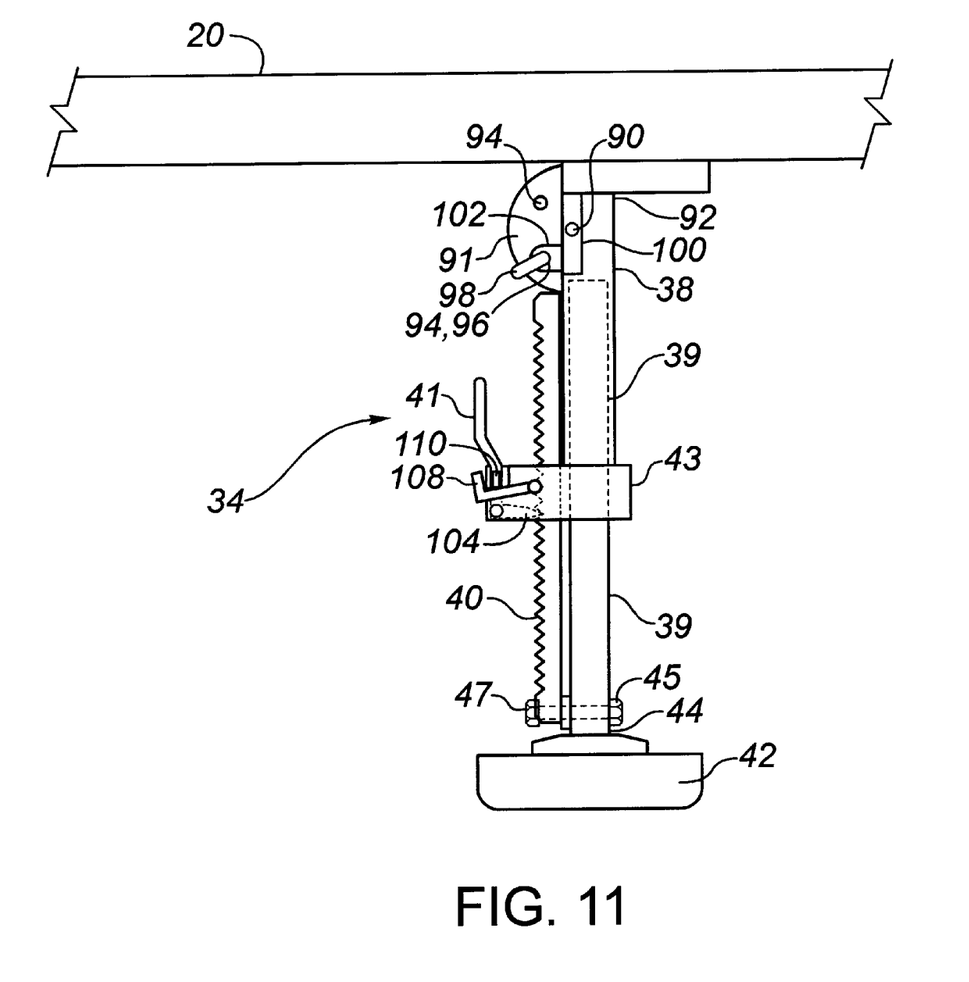
FIG. 11 is a detailed side elevation view of the pressure member for the animal squeeze illustrated in FIG. 1, in a substantially vertical operative position with locking lever in a locking position.

Referring to FIGS. 2 and 3, a vertically oriented pressure member 34 is movably secured to upper support structure 20 of chute 12. Referring to FIGS. 9 through 11, pressure member 34 has a tubular body 38, a piston 39 that extends telescopically from body 38, and a pad 42 at a remote end 44 of piston 39. Piston 39 is releasably locked into a selected position relative to body 38 by means of a cantilevered toothed rail 40 attached at remote end 44 of piston 39 by a nut 45 and bolt 47, and a locking lever 41, with teeth 104, pivotally attached to a collar 43 affixed to body 38.

Referring to FIGS. 9 through 11, pressure member 34 has a pivot 90 by which body 38 is pivotally attached to a pressure member support 100 at an upper end 92 of body 38. Pressure member support 100 is rigidly attached to upper support member 20. Body 38 of pressure member 34 has a protruding plate 91 that is substantially coplanar with body 38. Plate 91 has a pair of holes 94 at opposed ends of plate 91. Pressure member 34 is pivotally movable about pivot 90 between a stored position illustrated in FIG. 9 and an operative position illustrated in FIGS. 10 and 11. Pressure member support 100 includes a pin 96 that has a handle 98. Pin 96 is constrained to slide lengthwise through a hole 112 in a protruding pressure plate 102 extending from pressure member support 100. Pin 96 is retractably inserted through one of pair of holes 94 to lock pressure member 34 into one of stored position and operative position. Pin 94 is biased into a position in which said pin 94 is inserted into one of pair of holes 94 in plate 91 by a spring (not shown) that applies a force laterally along pin 94 by exerting an opposing force against pressure plate 102. Pressure member 34 is released from stored position illustrated in FIG. 9 by pulling handle 98 to retract pin 96 from upper hole 94 in plate 91. Pressure member 34 is then free to move pivotally about pivot 90 and descend to operating position illustrated in FIGS. 10 and 11. Handle 98 is released and pressure from the spring forces pin 96 into lower hole 94 in plate 91, thereby securing pressure member 34 in the operating position. Pressure member 34 is released from operating position by pulling handle 98 to release pin 96 from lower hole 94, thereby allowing pressure member 34 to be moved to the stored position and locked in said stored position by pin 96 engaging upper hole 94 of plate 91.

When pressure member 34 is in the operating position, said pressure member is telescopically expandable from a retracted position, illustrated in FIG. 2, to an operative position, illustrated in FIG. 3. Referring to FIGS. 10 and 11, locking lever 41 is pivotally movable between a released position illustrated in FIG. 10 and a locked position illustrated in FIG. 11. Referring to FIG. 10, when locking lever 41 is in released position teeth 104 do not engage toothed rail 40, thereby allowing piston 39 to move freely in a coaxial direction relative to body 38, as indicated by a double arrow 106. Referring to FIG. 11, when pad 42 is at a selected distance from upper support structure 20, locking lever 41 is raised and teeth 104 engage toothed rail 40 to lock piston 39 in position relative to body 38. Locking lever 41 is locked into a raised position by a locking member 108 that engages a catch 110 on lever 41.

Referring to FIG. 7, when pressure member 34 is extended it exerts a substantially vertical downward force upon a back 36 of animal 28 positioned within chute 12. Pressure member 34 is locked in a selected telescopic position, as illustrated in FIG. 11. There are various means by which this can be accomplished, of which one means that has been found to be effective is described above with reference to FIGS. 9 through 11.

Figure 8:
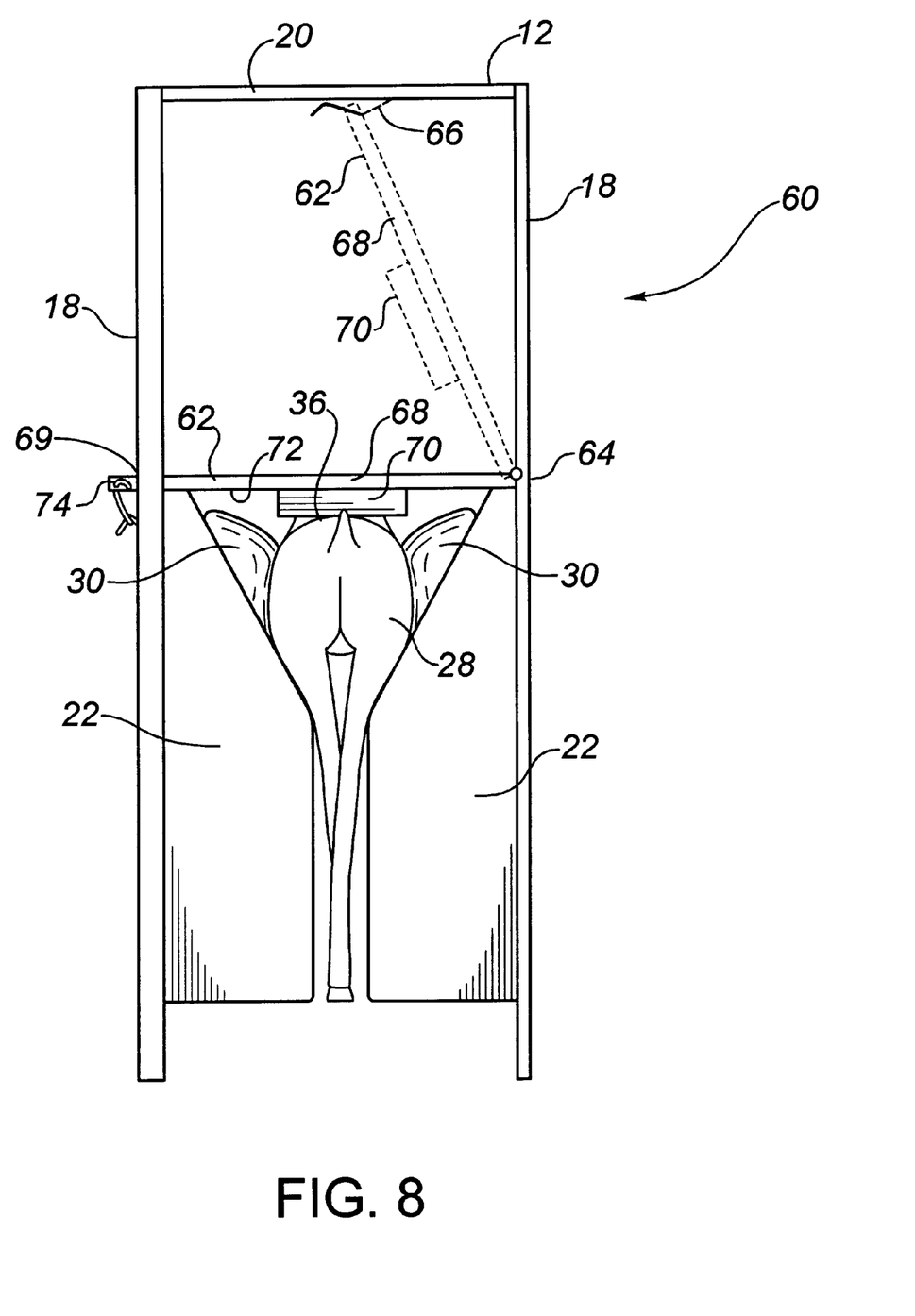
FIG. 8 is an end elevation view of an alternative embodiment of pressure member.

Referring to FIG. 8, an alternative embodiment of animal squeeze 60 includes a chute 12 essentially similar to chute 12 of the above embodiment of animal squeeze 10. Alternative embodiment 60 differs from animal squeeze 10 in that pressure member 34 of animal squeeze 10 is replaced by a pressure bar 62 pivotally mounted at an intermediate height 64 on one of sidewalls 18. Pressure bar 62 has a member 68 that has a length sufficiently long that pressure bar 62 extends laterally across chute 12 and through an opening 69 in opposite sidewall 18. A pad 70 is mounted on an underside 72 of member 68. Pressure bar 62 has an inoperative position, held up by hook 66, as indicated by dashed lines. When an animal is constrained by wedge members 30 within chute 12, pressure bar is detached from hook 66 and moved to the operative position in which pad 70 applies a restraining pressure on back 36 of animal 28. Pressure bar 62 is retained in the operative position by a catch 74.

Figure 6:
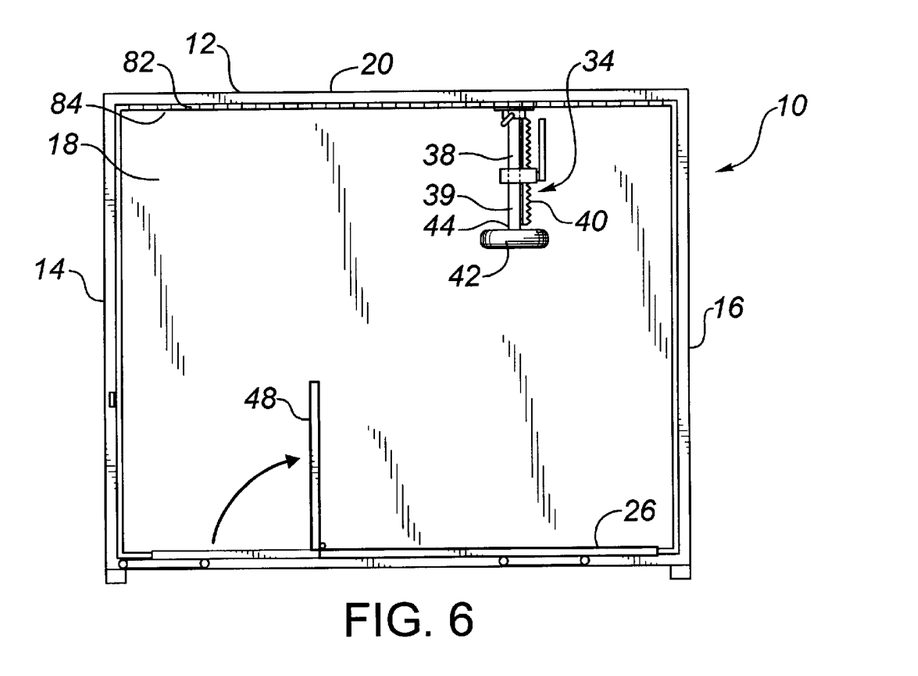
FIG. 6 is a side elevation view, in section, of the animal squeeze illustrated in FIG. 1.

Referring to FIG. 1, a side entry service door 46 is provided which is large enough for a human to enter chute 10 through one of sidewalls 18 at first end 14 of chute 12. Referring to FIGS. 6 and 7, kick guard 48 has an operative position in a vertical orientation extending transversely across chute 12 adjacent side entry service door 46 at first end 14 and toward second end 16. Referring to FIG. 7, when kick guard 48 is in the operative position it is positioned between animal 28 and a region 51 at first end 14 of chute 12 into which a human can enter to perform work on animal 28, thereby preventing animal 28 from kicking the human. In a preferred embodiment, kick guard 48 is a pivotally mounted section of drop floor 26.

Figure 4:
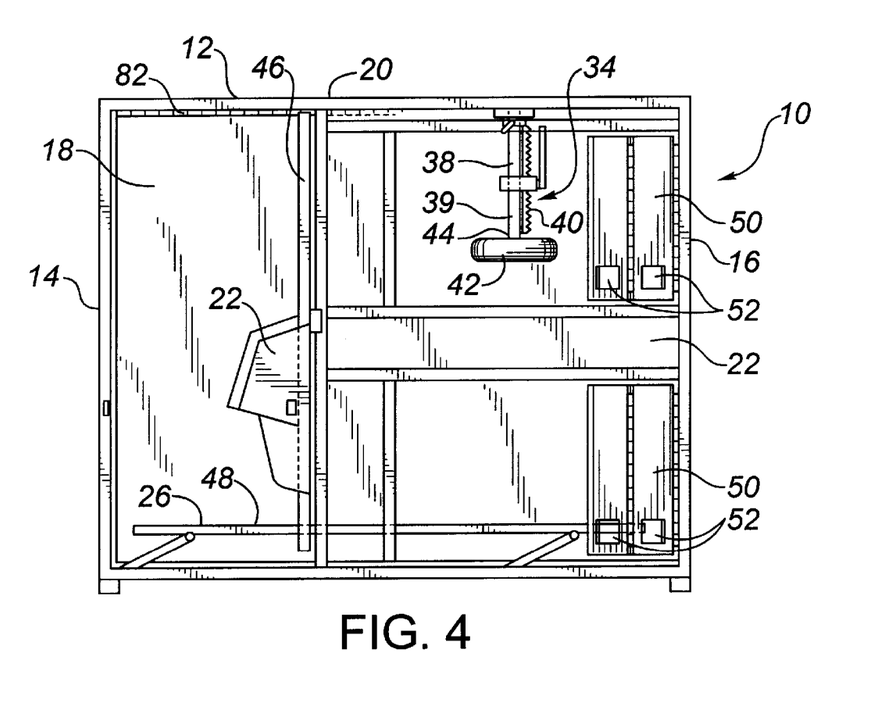
FIG. 4 is a side elevation view of the animal squeeze illustrated in FIG. 1, with the side entry access door open and the shutters on the upper and lower access doors open.

Referring to FIG. 1, sidewalls 18 of chute 12 have shuttered upper and lower access doors 50. Shuttered doors 50 have openings 52 through which an animal 28 in chute 12 can be viewed. Referring to FIG. 4, shuttered doors 50 can be opened to allow a human to perform work on an animal 28 within chute 12.

A method of restraining a deer within an animal squeeze will now be described with reference to FIGS. 1 through 12. An animal squeeze 10, as described above is provided. Drop floor 26 is in the raised position, as illustrated in FIG. 3. Hinged sidewall 18 is in the closed position, as illustrated in FIG. 5. Pressure member 34 is in the stored position, as illustrated in FIG. 9. Animal 28 is directed through first end 14 into chute 12. Animal 28 moves through chute 12 until its forward progress is impeded by shoulders 30. Sensor 112 detects the presence of animal 28, and triggers the drop floor release mechanism. Drop floor 26 drops to a dropped position, as illustrated in FIG. 2, leaving animal 28 suspended in "V" shaped passage 24 by wedge members 22 as illustrated in FIG. 7. Animal 28 will continue to struggle, even though suspended. Pressure member 34 is then positioned vertically in the operative position and lever 41 is moved to the released position, as illustrated in FIG. 10. Support member 34 is telescopically extended, as illustrated in FIG. 11, until pad 42 engages back 36 of animal 28 as illustrated in FIG. 7. Lever 41 is moved to the upright vertical position and locked in said position by locking member 108, thereby applying a restraining force on back 36 of animal 28. It has been found that, when pad 42 exerts a restraining force upon back 36 of animal 28, animal 28 stops struggling. Kick guard 48 is raised as indicated by curved arrow 60 into the operative position, as illustrated in FIG. 6, thereby preventing animal 28 from kicking into region 51 of chute 12, as illustrated in FIG. 7. A human can enter region 51 of chute 12 through service door 46, illustrated in FIGS. 1 and 4, to work at a rear end 54 of animal 28 illustrated in FIG. 7. A human can access a head 56 or an underside 58 of animal 28, illustrated in FIG. 7, by opening shuttered doors 50, as illustrated in FIG. 4. When the work to be performed on animal 28 has been completed, hinged sidewall 18 is moved pivotally away from the opposed sidewall 18, as illustrated in FIG. 12. Wedge member 22 and shoulder 30 attached to hinged sidewall 18 are thereby moved to a retracted position, whereby passage 24 is widened, and the animal is released. Animal 28 slips freely to drop floor 26 and exits chute 12 through second end 16.

It should be noted that when the pressure member is said to be brought down upon the back of the animal, the term back is intended to be used in the broadest sense to encompass those areas along the top of the animal that include the shoulders and the hips. Although one pressure member is illustrated, more than one could be used effectively. It has been found that a single pressure member positioned at the midpoint of the back has the desired effect. If one of the pressure members is not positioned at the midpoint of the back, it is possible for the animal to arch its back. If the animal can arch its back, it is able to release itself from the force of peripheral pressure members. There is also a danger that in arching its back, its legs will strike each other and cause injury.

Once the teachings of the present invention are understood, it will be appreciated that there are various ways of hinging all or a portion of one of the sidewalls to widen the passage to release the animal. For example, a portion of the sidewall at the second end of the passage could be pivoted about a substantially vertical axis.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An animal squeeze, comprising:
    a chute having a first end, a second end, sidewalls, a floor and a generally "V" shaped passage that extends from the first end to the second end;
    a side entry service door in at least one of the sidewalls at the first end of the chute large enough for a human to enter;
    means for relative movement of the sidewalls and the floor to suspend an animal in the "V" shaped passage;
    a pressure member movably secured to the chute and having a substantially vertical operative position exerting a substantially vertical downward force upon a back of an animal positioned within the chute; and
    a kick guard within the chute at an intermediate position adjacent the side entry service door and toward the second end, the kick guard having a stored position and an operative position, in the operative position the kick guard being positioned in a vertical orientation extending transversely across the chute.

2. The animal squeeze as defined in claim 1, wherein the chute has an upper support structure that overlies the passage, the pressure member being mounted to the upper support structure, the pressure member being telescopically expandable, with means for locking the pressure member in a selected telescopic position.

3. The animal squeeze as defined in claim 1, wherein the pressure member has a substantially horizontal stored position.

4. The animal squeeze as defined in claim 3, wherein the pressure member includes a first telescopic member carrying a cantilevered toothed rail and a second telescopic member carrying a locking lever with teeth, the lever having a release position in which the teeth of the locking lever are spaced from the toothed rail and a locking position in which the teeth of the locking lever engage the toothed rail.

5. The animal squeeze as defined in claim 1, wherein a sensor positioned within the chute is coupled to a release mechanism for a drop floor, such that the release mechanism for the drop floor is tripped to drop the floor upon the presence of an animal being sensed by the sensor.

6. The animal squeeze as defined in claim 1, wherein the sidewalls are parallel with opposed wedge members extending longitudinally along the sidewalls between the first end and the second end to make the passage generally "V" shaped, and a drop floor that is selectively movable between a supporting position supporting an animal and dropped position leaving the animal wedged between the wedge members in the generally "V" shaped passage.

7. The animal squeeze as defined in claim 1, wherein the kick guard is a pivotally mounted section of the floor.

8. The animal squeeze as defined in claim 1, wherein a pair of opposed shoulders extend into the passage for blocking passage of an animal from the second end of the chute.

9. The animal squeeze as defined in claim 1, wherein the chute has shuttered upper and lower access doors in the sidewalls.

10. The animal squeeze as defined in claim 1, wherein all or a portion of one of the sidewalls of the chute pivots to widen the passage whereby the animal is dropped to the ground and permitted to exit from the second end of the chute.

11. An animal squeeze, comprising:
a chute having a first end, a second end, sidewalls, a floor and a generally "V" shaped passage that extends from the first end to the second end;
means for relative movement of the sidewalls and the floor to suspend an animal in the "V" shaped passage;
a pressure member movably secured to the chute and having a substantially vertical operative position exerting a substantially vertical downward force upon a back of an animal positioned within the chute; and
wherein all or a portion of one of the sidewalls of the chute pivots to widen the passage so that the animal is dropped to the ground and permitted to exit from the second end of the chute, and one of the sidewalls of the chute has hinges along a top peripheral edge and pivots about a substantially horizontal axis to widen the passage whereby the animal is dropped to the ground and permitted to exit from the second end of the chute.

12. An animal squeeze, comprising:
a chute having a first end, a second end, a pair of paralleled sidewalls having opposed wedge members extending longitudinally along the sidewalls to form a generally "V" shaped passage that extends from the first end to the second end, a floor and an upper support structure that overlies the passage;
the floor being a drop floor which is selectively movable relative to the sidewalls between a supporting position supporting an animal and dropped position leaving the animal suspended in the "V" shaped passage;

a telescopically expandable pressure member movably mounted to the upper support structure of the chute and having a substantially horizontal stored position and a substantially vertical operative position, the pressure member being telescopically expandable in the operative position to exert a substantially vertical downward force upon a back of an animal positioned within the chute, with means being provided for locking the pressure member in a selected telescopic position; and
one of the sidewalls of the chute is hinged along a top peripheral edge and pivots about a substantially horizontal axis to widen the passage whereby the animal is dropped to the ground and permitted to exit from the second end of the chute.

13. The animal squeeze as defined in claim 12, wherein the pressure member includes a first telescopic member carrying a cantilevered toothed rail and a second telescopic member carrying a locking lever with teeth, the lever having a release position in which the teeth of the locking lever are spaced from the toothed rail and a locking position in which the teeth of the locking lever engage the toothed rail.

14. The animal squeeze as defined in claim 12, wherein a sensor positioned within the chute is coupled to a release mechanism for the drop floor, such that the release mechanism for the drop floor is tripped to drop the floor upon the presence of an animal being sensed by the sensor.

15. The animal squeeze as defined in claim 12, wherein the chute has a side entry service door in at least one of the sidewalls at the first end of the chute large enough for a human to enter.

16. The animal squeeze as defined in claim 15, wherein a kick guard is positioned within the chute at an intermediate position adjacent the side entry service door and toward the second end, the kick guard having an operative position in a vertical orientation extending transversely across the chute.

17. The animal squeeze as defined in claim 16, the kick guard is a pivotally mounted section of the floor.

18. The animal squeeze as defined in claim 12, wherein a pair of opposed shoulders extend into the passage for blocking passage of an animal from the second end of the chute.

19. The animal squeeze as defined in claim 18, wherein shoulder mountings are provided at both the first end and the second end of the passage, the shoulders being detachably secured to either the first end or the second end of the passage, depending upon the direction from which it is most convenient to have the animal enter.

20. The animal squeeze as defined in claim 12, wherein the chute has shuttered upper and lower access doors in the sidewalls.

* * * * *